United States Patent [19]

Mishina et al.

[11] Patent Number: 5,038,496
[45] Date of Patent: Aug. 13, 1991

[54] VAPOR REFLOW TYPE SOLDERING APPARATUS

[75] Inventors: Haruo Mishina, Ushiku; Shinya Yamama, Abiko; Yukio Yamada, Katsuta; Keizo Tsuchiya, Kashiwa, all of Japan

[73] Assignee: Hitachi Techno Engineering Co., Ltd., Tokyo, Japan

[21] Appl. No.: 385,160

[22] Filed: Jul. 26, 1989

[30] Foreign Application Priority Data

Jul. 27, 1988 [JP] Japan ............................... 63-185622
Oct. 24, 1988 [JP] Japan ............................... 63-266051
Dec. 9, 1988 [JP] Japan ............................... 63-309978

[51] Int. Cl.$^5$ .............................................. F26B 21/06
[52] U.S. Cl. ........................................... 34/78; 34/231
[58] Field of Search .................. 34/77, 78, 79, 231; 432/197, 194; 228/180.1; 118/729, 61, 58

[56] References Cited

U.S. PATENT DOCUMENTS

| | | | |
|---|---|---|---|
| 4,389,797 | 6/1983 | Spigarelli et al. | 34/73 |
| 4,628,616 | 12/1986 | Shirai et al. | 34/78 |
| 4,735,001 | 4/1988 | Mishina et al. | 34/78 |
| 4,766,677 | 8/1988 | Brooks et al. | 34/78 |
| 4,776,105 | 10/1988 | Mishina | 34/78 |
| 4,809,443 | 3/1989 | Mishina | 34/73 |
| 4,897,934 | 2/1990 | Peck | 34/78 |

*Primary Examiner*—Henry A. Bennet
*Attorney, Agent, or Firm*—Antonelli, Terry, Stout & Kraus

[57] ABSTRACT

A vapor reflow type soldering apparatus comprises a vapor generating tank disposed substantially centrally in the apparatus for receiving therein a thermal medium and saturated vapor of said thermal medium; a preheating chamber arranged upstream of the vapor generating tank; a cooling chamber arranged downstream of the vapor generating tank; an inlet side passage connecting the vapor generating tank and the preheating chamber; an outlet side passage connecting the vapor generating tank and the cooling chamber; a conveyor extending horizontally through the preheating chamber, the inlet side passage, the vapor generating tank, the outlet side passage and the cooling chamber, wherein the conveyor can vary the width thereof; an outlet side exhaust port provided at the outlet side passage; an inlet side cooler arranged beneath the inlet side passage and having a cover at an upper position thereof; an outlet side cooler arranged beneath the outlet side passage and extending close to the outlet side exhaust port; a lower vapor discharge opening formed below the conveyor within the vapor generating tank; and a shutter connected with a movable conveyor guide and also with the peripheral part of the lower vapor discharge opening, whereby the opening area of said lower vapor discharge opening can be varied as the movable conveyor guide is moved widthwise.

11 Claims, 11 Drawing Sheets

VAPOR REFLOW TYPE SOLDERING APPARATUS

BACKGROUND OF THE INVENTION

This invention relates to a vapor reflow type soldering apparatus and more particularly to a vapor reflow type soldering apparatus suitable for soldering I.C. packages, resistors, capacitors, etc. to a printed circuit board.

Vapor reflow type soldering apparatus suitable for soldering I.C. packages, resistors, capacitors, etc. to a printed circuit board are disclosed in U.S. Pat. Nos. 4,735,001, 4,776,105 and 4,809,443. In these apparatus, a printed circuit board with electronic parts mounted thereon is first preheated in the preheating chamber provided near the inlet of the transfer passage and then, it is transferred into the vapor generating tank in which saturated vapor of a thermal medium is contained. In the vapor generating tank, a part of the saturated vapor is discharged from the longitudinal vapor discharge openings which are opened along the transfer passage and it is supplied on the printed circuit board. The saturated vapor concentrates at the leads of the electronic pats to be soldered, and the leads, particularly, are heated by the condensation latent heat of the saturated vapor. By this heating, the solder paste placed at the positions corresponding to the leads is melted. Then, the printed circuit board is transferred out of the vapor generating tank into the cooling chamber. By the final step of cooling, the solder solidifies and the soldering process is thus completed.

The conventional vapor reflow type soldering apparatus as described above have the following problems.

(1) Between the preheating chamber and the vapor generating tank, there is provided beneath the transfer passage a cooler for cooling and collecting the vapor that has flowed into the transfer passage. As a result, while transferred from the preheating chamber through the transfer passage to the vapor generating tank, the printed circuit board is cooled, thus reducing the preheating effects. Further, in soldering, the solder can increase in strength if it is cooled quickly after melted. Therefore, the printed circuit board that comes out of the vapor generating tank should preferably be cooled quickly. Another cooler is provided beneath the transfer passage between the vapor generating tank and the cooling chamber in order to cool and collect the vapor that has flowed into the transfer passage. This cooler is capable of quick, cooling the printed circuit board. However, a certain distance set between this cooler and the cooling chamber so as to prevent the flow of the vapor out of the apparatus contributes to slackening the cooling speed of the printed circuit board. Consequently, there is uneasiness about the reliability of soldering.

(2) The density of a thermal medium used for heating the printed circuit board is as high as 2-0 times that of air. Therefore, the vapor falls straight downward immediately after discharged from the longitudinal vapor discharge openings. Then, the vapor flows width-wise. With printed circuit boards having electronic parts mounted thereon at high density, it is difficult for the vapor discharged from the longitudinal vapor discharge openings to reach the central area of the printed circuit board as its flow is obstructed by the electronic parts mounted thereon. As a result, the temperature distribution across the width of the printed circuit board becomes uneven. Further, in a case where the width of the conveyor constituting the transfer passage is varied in accordance with the width of the printed circuit board, the vapor discharged from a longitudinal vapor discharge opening located at a movable conveyor guide, which has been moved to vary the width, is hindered by the conveyor guide from flowing toward the printed circuit board, so that the amount of the vapor reaching the printed circuit board becomes small in comparison with the vapor discharged from a longitudinal vapor discharge opening located at the fixed conveyor guide. Also in this case, the temperature distribution across the width of the printed circuit board becomes uneven, so that the reliability of the soldering is lowered.

SUMMARY OF THE INVENTION

The object of this invention is to provide a vapor reflow type soldering apparatus capable of improving reliability of soldering work.

According to the invention, there is provided a vapor reflow type soldering apparatus comprising a vapor generating tank disposed substantially centrally in the apparatus for receiving therein a thermal medium and a saturated vapor of the thermal medium; a preheating chamber arranged upstream of the vapor generating tank; a cooling chamber arranged downstream of the vapor generating tank; an inlet side passage connecting the vapor generating tank and the preheating chamber; an outlet side passage connecting the vapor generating tank and the cooling chamber; a conveyor extending horizontally through the preheating chamber, the inlet side passage, the vapor generating tank, the outlet side passage and the cooling chamber; an outlet side exhaust port provided at the outlet side passage; an inlet side cooler arranged beneath the inlet side passage; an outlet side cooler arranged beneath the outlet side passage and extending close to the outlet side exhaust port; and means for holding at a high position the height of the saturated vapor flowing into the inlet side passage.

It is preferable that the means for holding the height of the saturated vapor has a cover provided at an upper position of the inlet side cooler.

It is also preferable that the above-mentioned cover has at the upper surface thereof grooves that offer resistance to the flow of the saturated vapor toward the inlet.

The means for holding the height of the saturated vapor may include additional side walls provided at a portion of the inlet side passage just before the vapor generating tank so as to narrow the area of the passage, and additional side walls provided at a portion of the outlet side passage just after the vapor generating tank.

Preferably, the additional side walls provided in the inlet side passage are made longer than the additional side walls provided in the outlet side passage.

A vapor reflow type soldering apparatus according to another embodiment of the invention comprises a vapor generating tank, disposed substantially centrally in the apparatus for receiving therein a thermal medium and a saturated vapor of the thermal medium; a preheating chamber arranged upstream of the vapor generating tank; a cooling chamber arranged downstream of the vapor generating tank; an inlet side passage connecting the vapor generating tank and the preheating chamber; an outlet side passage connecting the vapor generating tank and the cooling chamber; a conveyor extending horizontally through the preheating chamber, the inlet side passage, the vapor generating tank, the outlet side passage and the cooling chamber, wherein the width of the conveyor is variable; an outlet side exhaust port provided at the outlet side passage; an inlet side cooler arranged beneath the inlet side passage and having a cover at an upper position thereof; an outlet side cooler arranged beneath the outlet side passage and extending close to the outlet side exhaust port; a lower vapor discharge opening formed at a lower position of the conveyor within the vapor generating tank; and a shutter connected with a movable conveyor guide and also with the peripheral part of the lower vapor discharge opening, whereby the opening area of the lower vapor discharge opening is varied as the movable conveyor guide is moved widthside.

The apparatus may further comprise a longitudinal vapor discharge opening opened above and along the conveyor within the vapor generating tank and means for varying the position of the longitudinal vapor discharge opening comprising a member which has an opening formed at a position thereof corresponding to the longitudinal vapor discharge opening and is fixed to the movable conveyor guide and a bellows connected between the member and the peripheral portion of the longitudinal vapor discharge opening.

Furthermore, the apparatus may comprise an upper vapor chamber provided above the conveyor within the vapor generating tank and having at a transverse side wall thereof an upper vapor discharge opening extending in the widthwise direction of the conveyor and a shutter, mounted on the upper vapor discharge opening, for varying the opening area of the upper vapor discharge opening, and connected to the movable conveyor guide.

In a still another embodiment of this invention, a vapor reflow type soldering apparatus comprises a vapor generating tank disposed substantially centrally in the apparatus for receiving therein a thermal medium and a saturated vapor of the thermal medium; a cooling chamber arranged downstream of the vapor generating tank; an inlet side passage connecting the vapor generating tank and the preheating chamber; an outlet side passage connecting the vapor generating tank and the cooling chamber; a conveyor extending horizontally through the preheating chamber, the inlet side passage, the vapor generating tank, the outlet side passage and the cooling chamber; an outlet side exhaust port provided at the outlet side passage; an inlet side cooler arranged beneath the inlet side passage and having a cover at an upper position thereof; an outlet side cooler arranged beneath the outlet side passage and extending close to the outlet side exhaust port a lower vapor discharge opening formed beneath the conveyor within the vapor generating tank; and an upper vapor chamber provided above the conveyor within the vapor generating tank and having an upper vapor discharge opening extending in the widthwise direction of the conveyor.

The upper vapor chamber may have installed therein a blower drawing the saturated vapor and making unit flow out of the upper vapor discharge opening.

The upper vapor discharge opening may be provided with louver for varying the opening area of the upper vapor discharge opening.

The conveyor may be of a type that can vary the width thereof, and the apparatus may include a shutter provided at the upper vapor discharge opening for varying the opening area of the upper vapor discharge opening, said shutter being connected with the movable conveyor guide.

DESCRIPTION OF THE PREFERRED EMBODIMENTS

Figure 1:
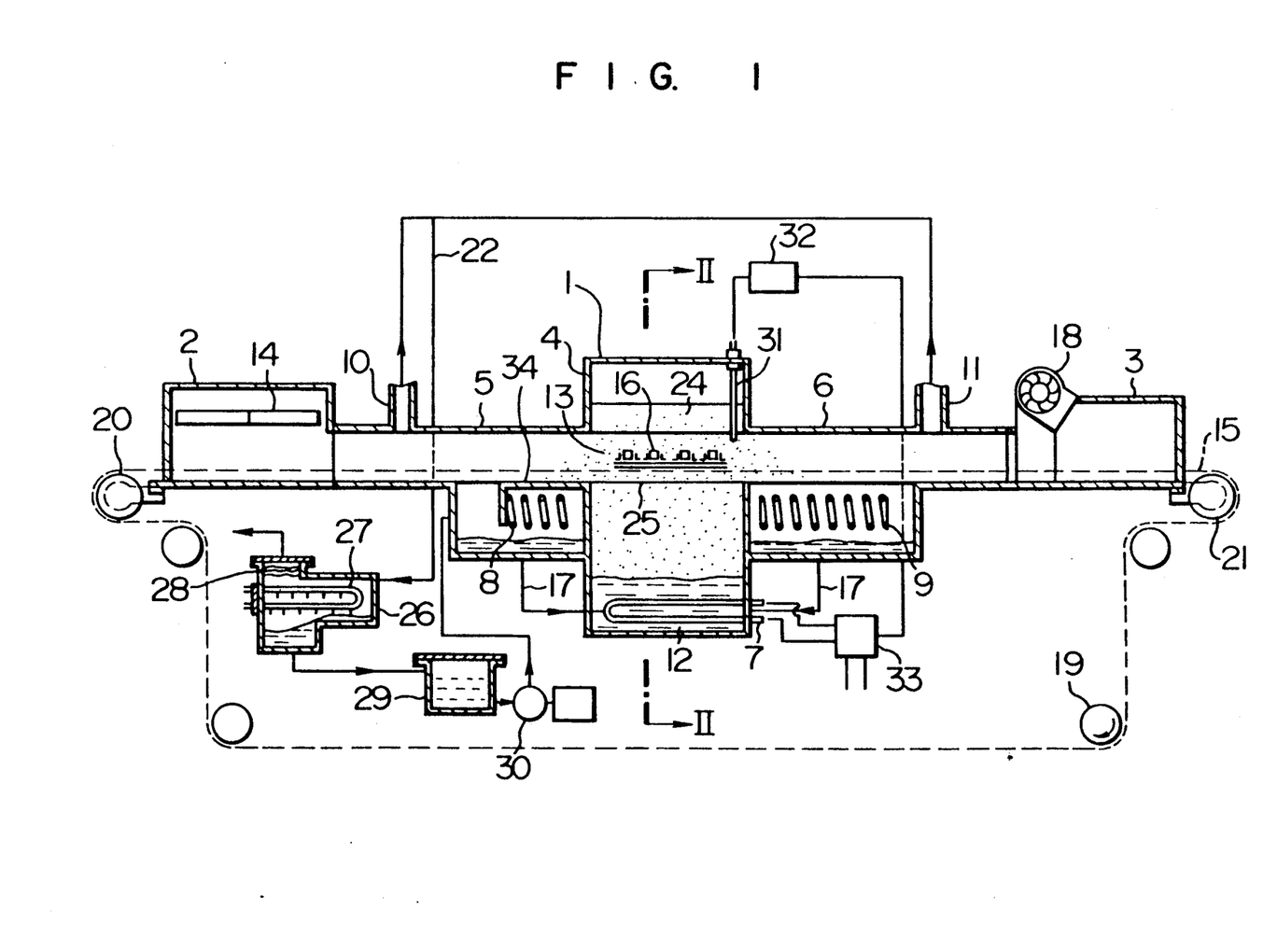
FIG. 1 is a cross-sectional side view of the vapor reflow type soldering apparatus according to a first embodiment of the invention.
Figure 2:
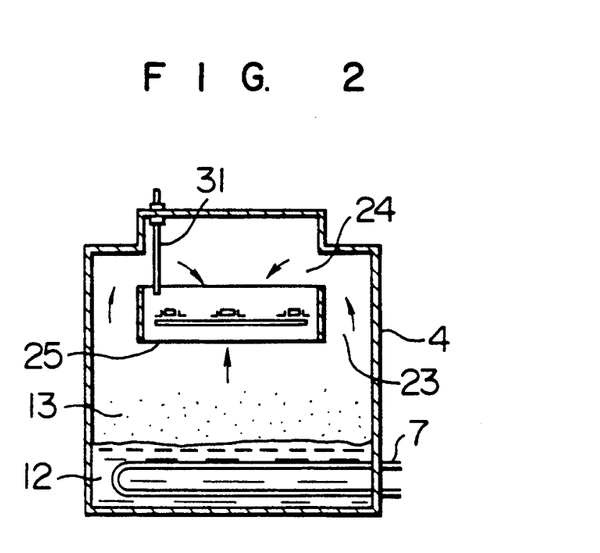
FIG. 2 is a cross-sectional view taken along the line II—II of FIG. 1.

The vapor reflow type soldering apparatus according to a first embodiment of the present invention will now be described with reference to FIGS. 1 and 2. This apparatus comprises a reflow chamber 1, a preheating chamber 2 arranged upstream of the reflow chamber 1 and a cooling chamber 3 arranged downstream of the reflow chamber 1. The reflow chamber 1 includes a vapor generating tank 4 arranged substantially centrally in the apparatus, an inlet side passage 5 connecting the vapor generating tank 4 to the preheating chamber 2, an outlet side passage 6 connecting the vapor generating tank to the cooling chamber, inlet and outlet side coolers 8 and 9 respectively arranged below the inlet and outlet side passages 5 and 6 for cooling and collecting vapor flowing into the passages, and inlet and outlet side exhaust ports 10 and 11 arranged at a certain distance from the inlet and outlet side coolers 8 and 9. The inlet and outlet side coolers 8 and 9 are connected by a pipe 17 to the vapor generating tank. The vapor generating tank 4 is of a structure such that it accommodates a liquefied thermal medium 12 and is filled with saturated vapor of the thermal medium 12. An electric heater 7 is provided in a bottom of the tank 4. A preheater 14 is provided in the preheating chamber 2; while a cooling fan 18 is provided in the cooling chamber 3. The vapor reflow type soldering apparatus further comprises a conveyor system for conveying printed circuit boards 16 through the preheating chamber 2, the reflow chamber 1 and the cooling chamber 3 and a thermal medium recovery system for collecting the thermal medium 12. The conveyor system includes the conveyor 15 extending horizontally through the preheating chamber 2, the inlet side passage 5, the vapor generating tank 4, the outlet side passage 6 and the cooling chamber 3, a driving roller 19 and guide rollers 20 and 21 located respectively at the inlet and the outlet of the apparatus. The thermal medium recovery system includes a collecting device 26, a water/acid remover 29 and a pump 30. The collecting device 26 has a cooling coil 27 and demister 28 and is communicated with the inlet side exhaust port 10 in the vicinity of the inlet of the inlet side passage 5 and also with the outlet side exhaust port 11 in the vicinity of the outlet of the outlet side passage 6. The water/acid remover 29 is connected to the collecting device 26 for removing water and/or acid. The pump 30 is connected to the cooler 8 for returning back to the cooler 8 the thermal medium from which water and/or acid have been removed.

The height of the saturated vapor 13 in the vapor generating tank 4 is adjusted by controlling a supply of electric power to the electric heater 7 by a temperature sensor provided movably in the vapor generating tank 4, and also by a temperature regulator 32 and a power regulator 33. At an upper position within the vapor generating tank 4, there is provided longitudinal side wall passages 23 that are communicated with longitudinal vapor discharge openings 24 which are opened above and along the conveyor 15. A lower vapor discharge opening 25 is formed beneath the conveyor 15.

A cover 34 is provided at an upper position of the inlet side cooler 8; however, no cover is provided for the outlet side cooler 9, which therefore is exposed to the outlet side passage 6. The outlet side cooler 9 is elongated so as to extend close to the outlet side exhaust port 11.

The operation of the thus constructed vapor reflow type soldering apparatus will be explained. The thermal medium 12 stagnant in the bottom of the vapor generating tank 4 is heated and vaporized by the heater 7 and rises within the vapor generating tank 4. A part of the saturated vapor 13 flows out of the lower vapor discharge opening 25 and heats the printed circuit board 16 from below. The rest of the saturated vapor rises within the longitudinal side wall passages 23 and flow out of the longitudinal vapor discharge openings 25 and heat the printed circuit board 16 from above. A part of the saturated vapor 13 that has heated the printed circuit board 16 is condensed and liquefied, thus falling downwardly and being accumulated in the bottom of the vapor generating tank 4. The rest of the vapor flows into the inlet side passage 5 and the outlet side passage 6. The vapor 13 that has been introduced into the inlet side passage 5, while keeping its height at a relatively high position owing to the presence of the cover, flows in the direction of the inlet for a while. Then, the vapor is cooled and liquefied by the inlet side cooler 8 and returned through the return pipe to the bottom of the vapor generating tank 4. The vapor 13 introduced into the outlet side passage 6 is immediately cooled and liquefied by the outlet side cooler 9 and returned through the return pipe 17 back to the bottom of the vapor generating tank 4. A small amount of the vapor 13, which remains, passes through the inlet side exhaust port 10 and the outlet side exhaust port 11 and flows into the collecting device 26 where the vapor is liquefied by the cooling coil 27 and the demister 28. The liquefied vapor 13 is sent to the water/acid remover 29 where the vapor is deprived of water and acid, and returned by a pump 30 back to the vapor generating tank 4.

The printed circuit board 16, which has been preheated by the preheater 14 in the preheating chamber 2, is carried by the conveyor 15 into the inlet side passage 5 where the circuit board 16 is heated by being contact with the saturated vapor 13 and when introduced into the vapor generating tank 4, the solder paste is heated and melted by the condensation latent heat of the saturated vapor 13. As soon as the printed circuit board 16 enters the outlet side passage 6, it is cooled, and when the circuit board goes into the cooling chamber, it is further cooled by the cooling fan 18, thereby completing the soldering step; then the circuit board is transferred out of the apparatus.

As described above, in this embodiment, owing to the presence of the cover 34 at the upper position of the inlet side cooler 8, the vapor 13, which is introduced into the inlet side passage 5, is not cooled immediately but flows toward the inlet while maintaining the level thereof. The printed circuit board 16 is transferred from the preheating chamber 2 into the vapor 13, the level of which is kept and therefore the printed circuit board 16 is heated by the vapor 13. As a result, the temperature of the printed circuit board 16 does not drop and the preheating effects can thus be maintained. In the outlet side passage 6, on the other hand, the thermal medium vapor 13 is immediately cooled and liquefied by the outlet side cooler 9, making the vapor 13 hardly present within the outlet side passage 6. For this reason, the printed circuit board 16 is cooled as soon as it is transferred into the outlet side passage 6. Further more, since the outlet side cooler 9 is elongated close to the outlet side exhaust port 11, the printed circuit board 16 is continuously cooled until just before it enters the cooling chamber 3. This increases soldering strength.

Therefore, the vapor reflow type soldering apparatus in accordance with this embodiment improves the reliability of soldering strength.

Figure 3:
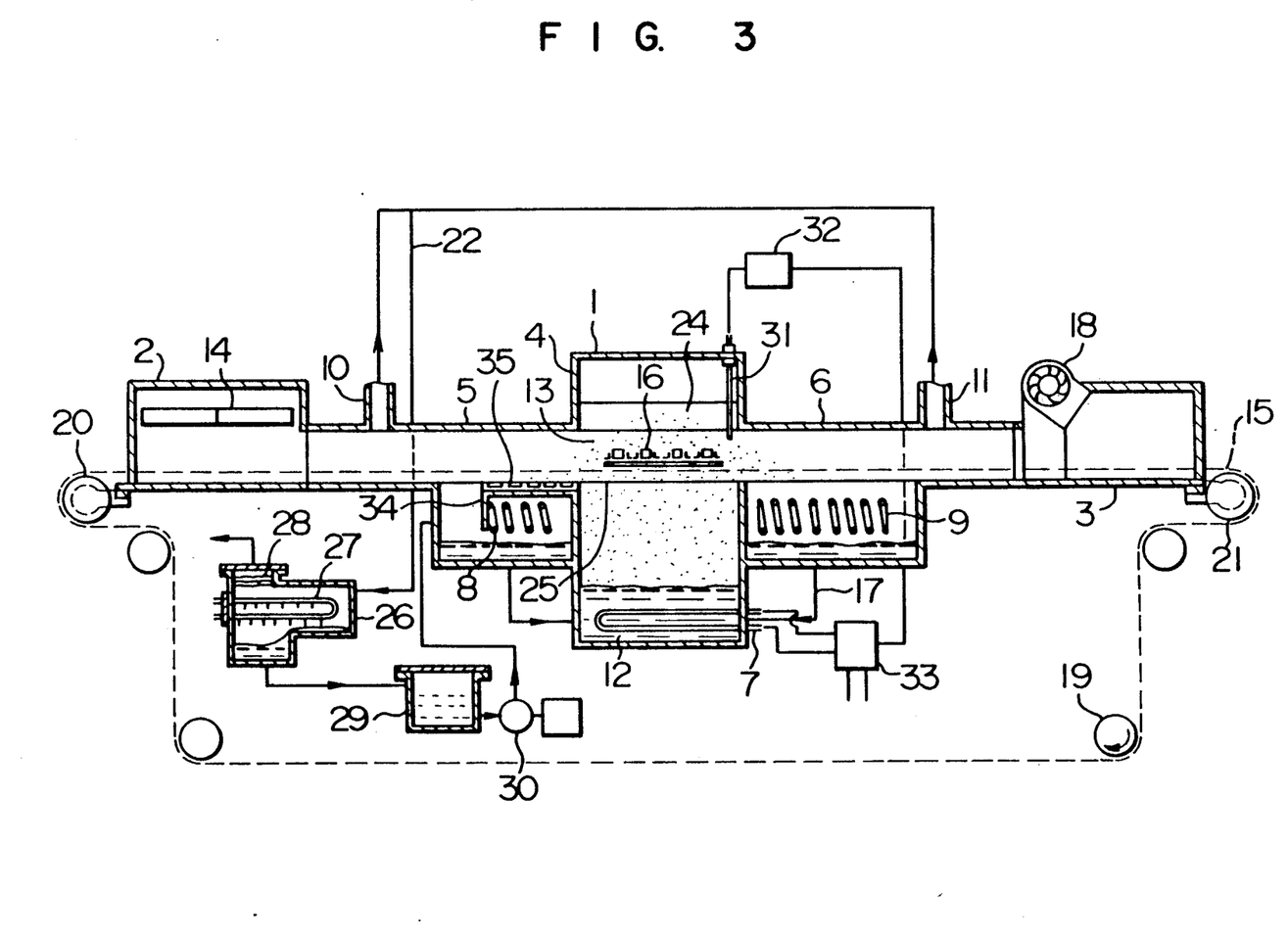
FIG. 3 is a cross-sectional side view of the vapor reflow type soldering apparatus according to a second embodiment of the invention.

A second embodiment of the present invention will be described with reference to FIG. 3. In the following description, the same reference numerals or characters are used to designate the same or like components or member as in the first embodiment, and hence, the duplication in explanation will be omitted. In the second embodiment, there are further provided grooves 35 on an upper surface of the cover 34 in the first embodiment for offering resistance to the flow of the vapor 13 toward the inlet, namely, grooves 35 offering a labyrinth effect. The other aspects of the structure of the second embodiment are the same as those of the first embodiment. By this means, the vapor 13 flowing toward the inlet encounters resistance and comes to flow with its level at a higher position than in the first embodiment. Consequently, the printed circuit board 16, sent from the preheating chamber 2, is certainly carried into the vapor 13 that has flowed into the inlet side passage 5, thereby allowing the preheating effects to be maintained securely.

Figure 4:
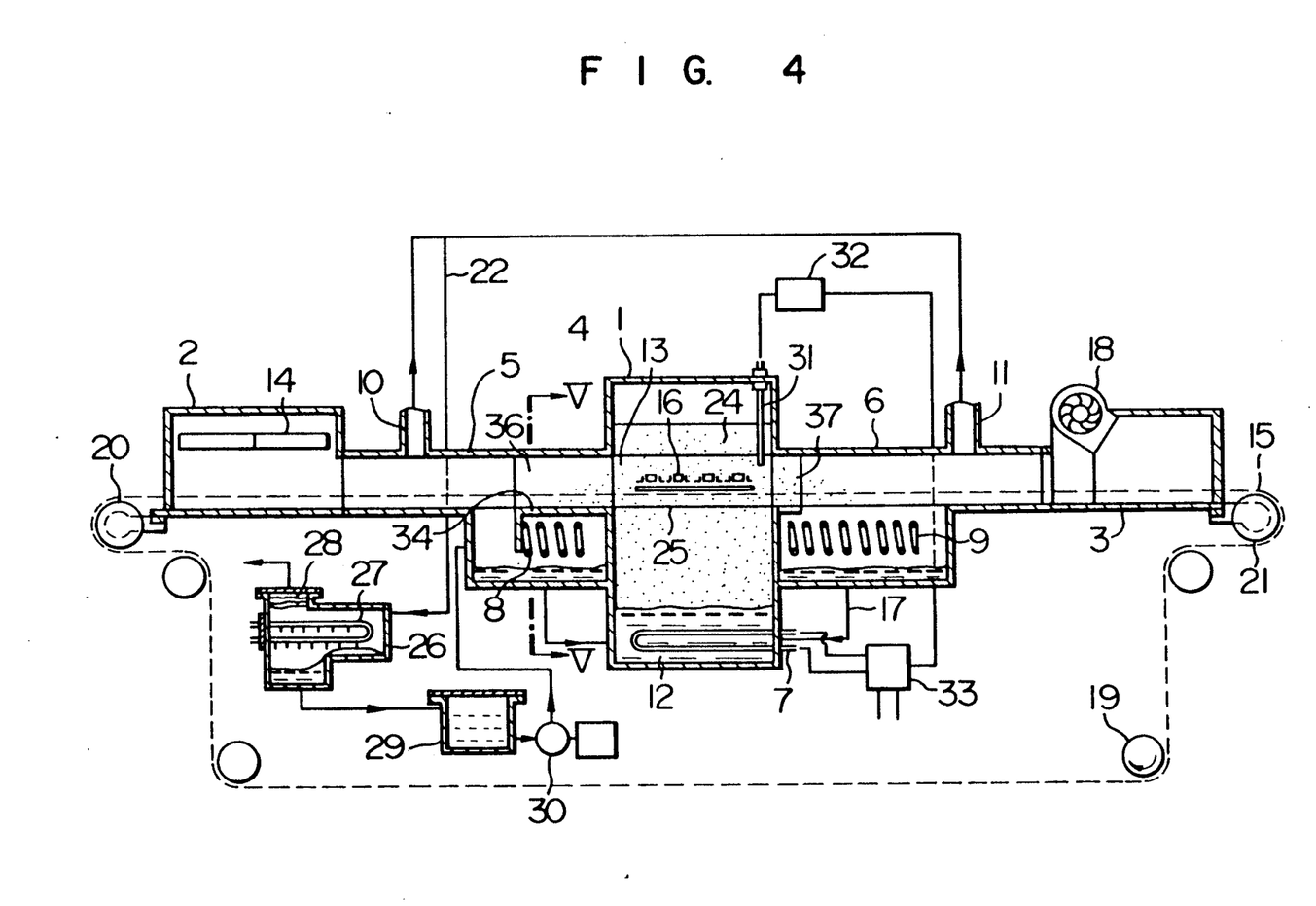
FIG. 4 is a cross-sectional side view of the vapor reflow type soldering apparatus according to a third embodiment of the invention.
Figure 5:
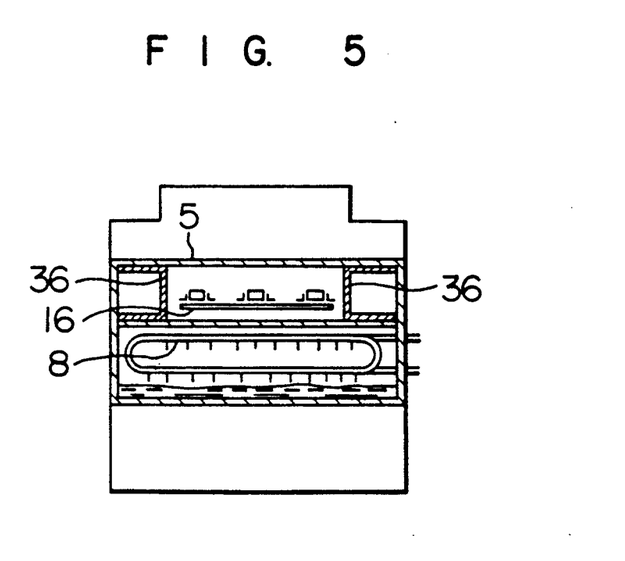
FIG. 5 is a cross-sectional view taken along the line V—V of FIG. 4.

FIGS. 4 and 5 show a vapor reflow type soldering apparatus according to a third embodiment of the invention. The third embodiment is identical with the first embodiment with an exception that the areas of the inlet and outlet side passages 5 and 6 before and after the vapor generating tank 4 of the first embodiment are narrowed in the third embodiment. In the third embodiment, additional longitudinal side walls 36 are provided at a portion of the inlet side passage 5 just before the vapor generating tank 4 so as to narrow the area of the passage. On the other hand, additional longitudinal side walls 37 are provided at a portion of the outlet side passage 6 just after the vapor generating tank 4 so as to narrow the area of the passage. Thus, the vapor 13 flowing into the inlet side passage flows toward the inlet with its vapor level kept at a high position, which ensures the retention of the preheating effects of the printed circuit board 16. The additional longitudinal side walls 37 serve to prevent a large amount of the vapor 13 from escaping into the outlet side passage 6, which would otherwise occur due to the provision of the additional longitudinal side walls 36. Any suitable lengths may be selected for the additional longitudinal side walls 36 and 37, but the additional longitudinal side wall 36 may be longer than the additional longitudinal side wall 37.

Figure 6:
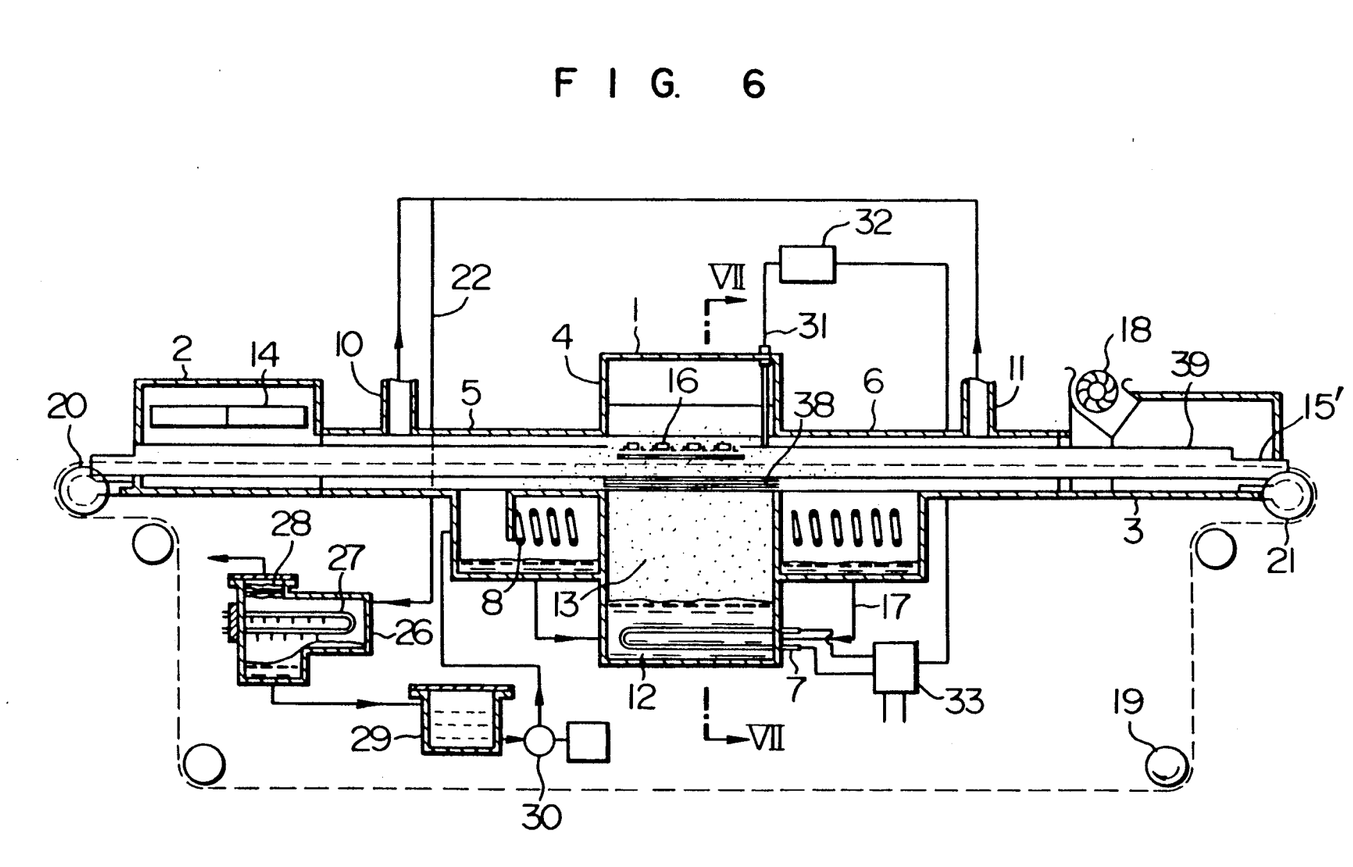
FIG. 6 is a cross-sectional side view of the vapor reflow type soldering apparatus according to a fourth embodiment of the invention.
Figure 7:
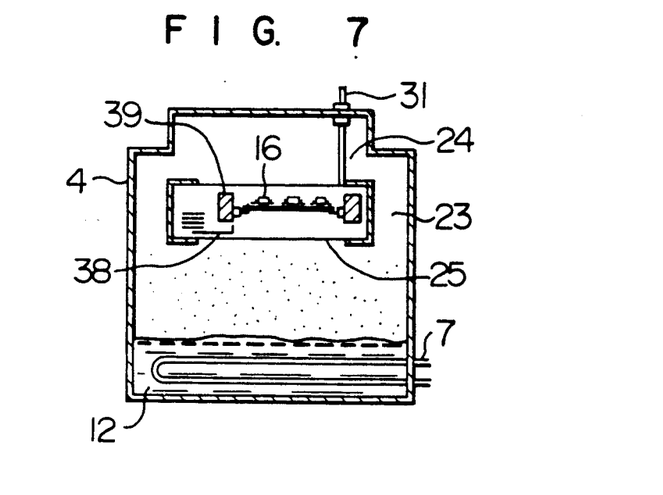
FIG. 7 is a cross-sectional view taken along the line VII—VII of FIG. 6.

FIGS. 6 and 7 show a vapor reflow type soldering apparatus in accordance with a fourth embodiment of the present invention. In the fourth embodiment, a conveyor 15' is used, the width of which can be varied to suit the size of a printed circuit board to be processed. The conveyor 15' may be a chain conveyor, for example, and a conveyor guide 39 is movable in the widthwise direction of the conveyor. A sliding door type shutter 38 is provided at the peripheral edge of the lower vapor discharge opening 25 and the conveyor guide 39 is connected at its lower portion with the shutter 38. Therefore, when the conveyor guide 39 is moved widthwise, the shutter 38 is pulled out and the opening area of the lower vapor discharge opening 25 is varied to suit the size of the printed circuit board 16.

The thermal medium 12 accumulated in the bottom of the vapor generating tank 4 is heated by the heater 7 and evaporates, and the saturated vapor 13 of the thermal medium rises within the vapor generating tank 4 and reaches the lower vapor discharge opening 25. Since the lower vapor discharge opening 25 has its width reduced by the shutter 38, the amount of vapor passing through the longitudinal side wall passages 23 and flowing out of the longitudinal vapor discharge openings 24 increase. By this increase in the amount of vapor, the vapor 13 can reach the center of the printed circuit board 16 even though obstructed by the electronic parts mounted at high density on the printed circuit board. The vapor 13 that has come down through the longitudinal vapor discharge openings 24 does not fall to the bottom of the vapor generating tank 4 but accumulates above the shutter 38; then, the vapor 13 can cross the conveyor guide 39 and flow toward the printed circuit board 16. In consequence, the temperature distribution across the width of the printed circuit board becomes uniform, thereby improving the reliability of soldering. Partly due to the increase in the amount of vapor from the longitudinal vapor discharge openings 24 and partly due to the vapor not falling to the bottom of the vapor generating tank 4, the level of the vapor above the printed circuit board 16 rises. This rise of the level of the vapor is detected by the temperature sensor 32 and the electric power regulator 33 decreases an electric power applied to the heater 7, thereby improving an economic advantage of the apparatus.

Figure 8:
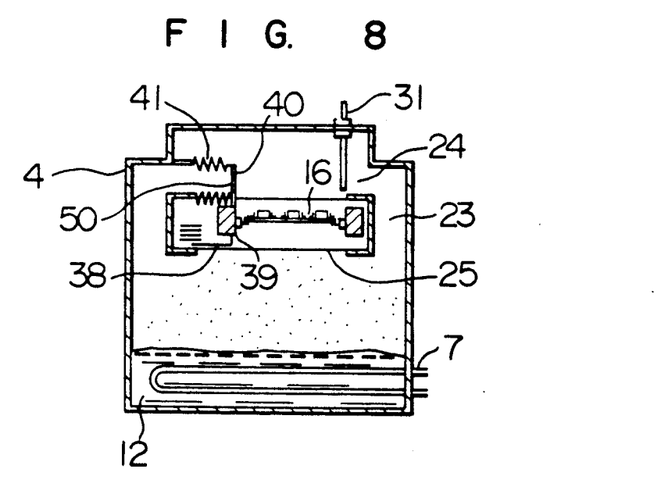
FIG. 8 is a cross-sectional view, taken along the same line of FIG. 7, of the vapor reflow type soldering apparatus according to a fifth embodiment of the invention.

FIG. 8 shows a vapor reflow type soldering apparatus in accordance with a fifth embodiment of the invention. The fifth embodiment is a modification of the fourth embodiment. A member 40 having an opening 50 formed at a position thereof which corresponds to the longitudinal vapor discharge openings 24, is provided. Bellows 41 is connected between the member 40 and the peripheral part of the longitudinal vapor discharge opening 24. The member 40 is fixed to the conveyor guide 39. Thus, as the conveyor guide 39 is moved widthwise, the member 40 is moved widthwise, too.

The vapor 13 rising through the longitudinal side wall passage 23 flows out of the opening 50 of the member 40 without falling onto the shutter 38. Since the vapor 13 flows directly onto the printed circuit board 16, the vapor 13 can reach the central portion of the printed circuit board 16 more steadily than in the fourth embodiment. The results are a more uniform temperature distribution and an improved reliability of soldering.

Figure 9:
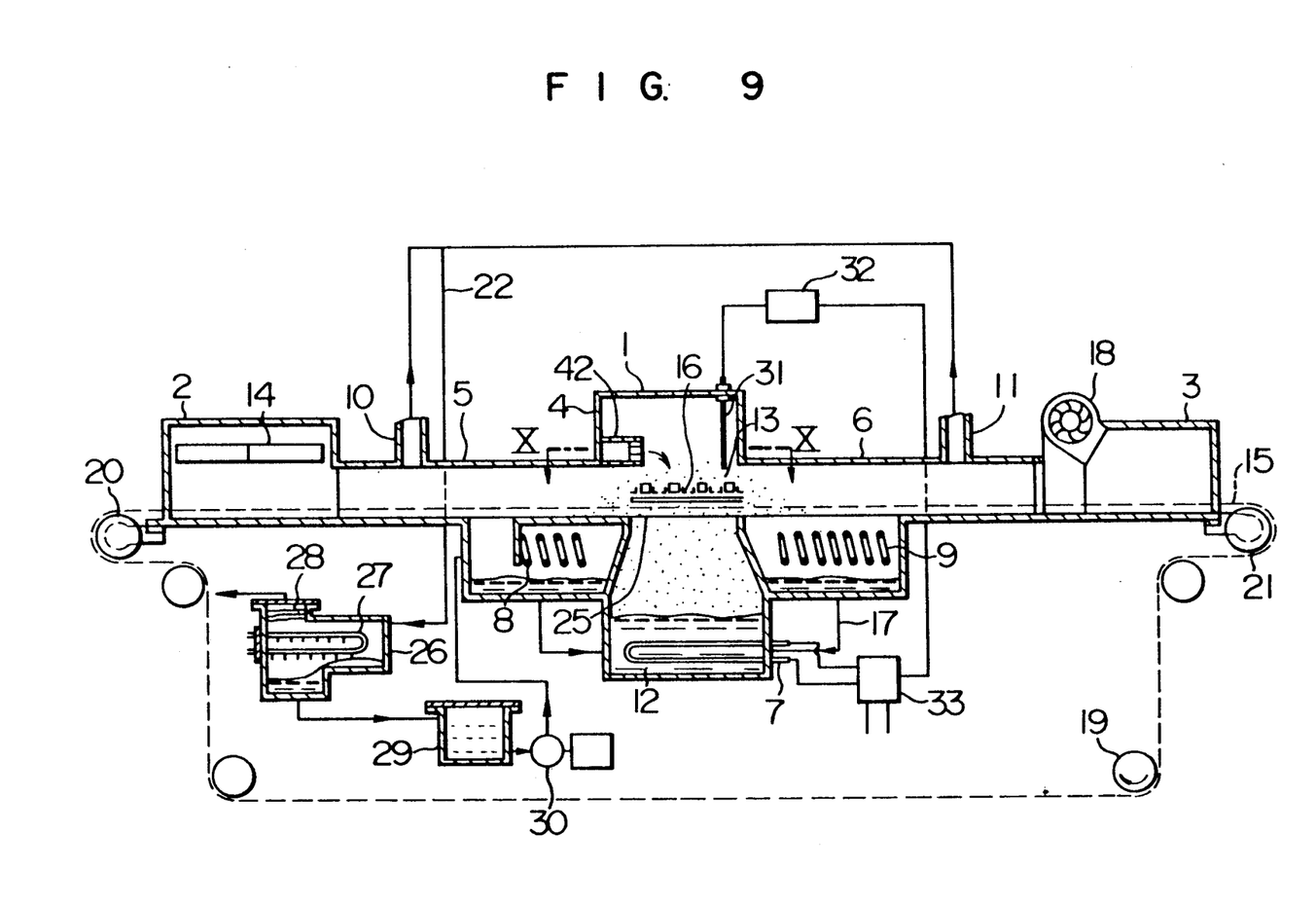
FIG. 9 is a cross-sectional side view of the vapor reflow type soldering apparatus according to a sixth embodiment of the invention.
Figure 10:
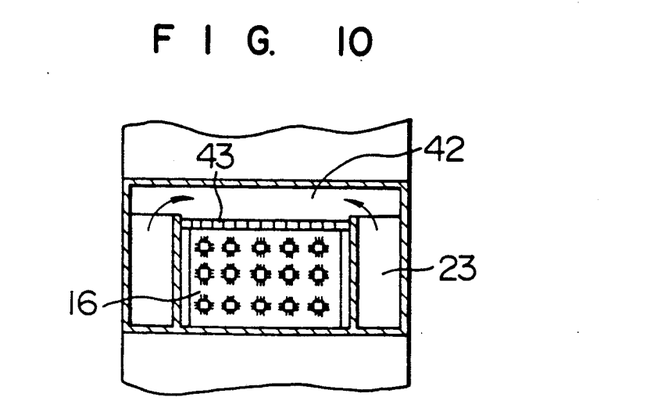
FIG. 10 is a cross-sectional view taken along the line X—X of FIG. 9.

FIGS. 9 and 10 show a vapor reflow type soldering apparatus in accordance with a sixth embodiment of the present invention. At an upper position in the vapor generating tank 4, there is provided an upper vapor chamber 42 extending in the widthwise direction of the conveyor 15. The upper vapor chamber 42 has at its widthwise side wall an upper vapor discharge opening 43 extending in the widthwise direction of the conveyor 15. The longitudinal side wall passages 23 are communicated with the upper vapor chamber 42; however, the longitudinal vapor discharge openings 24, which are provided in the foregoing embodiments, are not provided.

The vapor 13 rising through the longitudinal side wall passages flows into the upper vapor chamber 42 and then, flows out of the upper vapor discharge opening 43 onto the printed circuit board 16 on the conveyor 15. Obviously, the vapor 13 falls onto the printed circuit board 16 without being affected by the mounting condition of the electronic parts on the printed circuit board 16 and by the presence of the conveyor 15. This ensures a uniform widthwise temperature distribution and an improved reliability of soldering.

Figure 11:
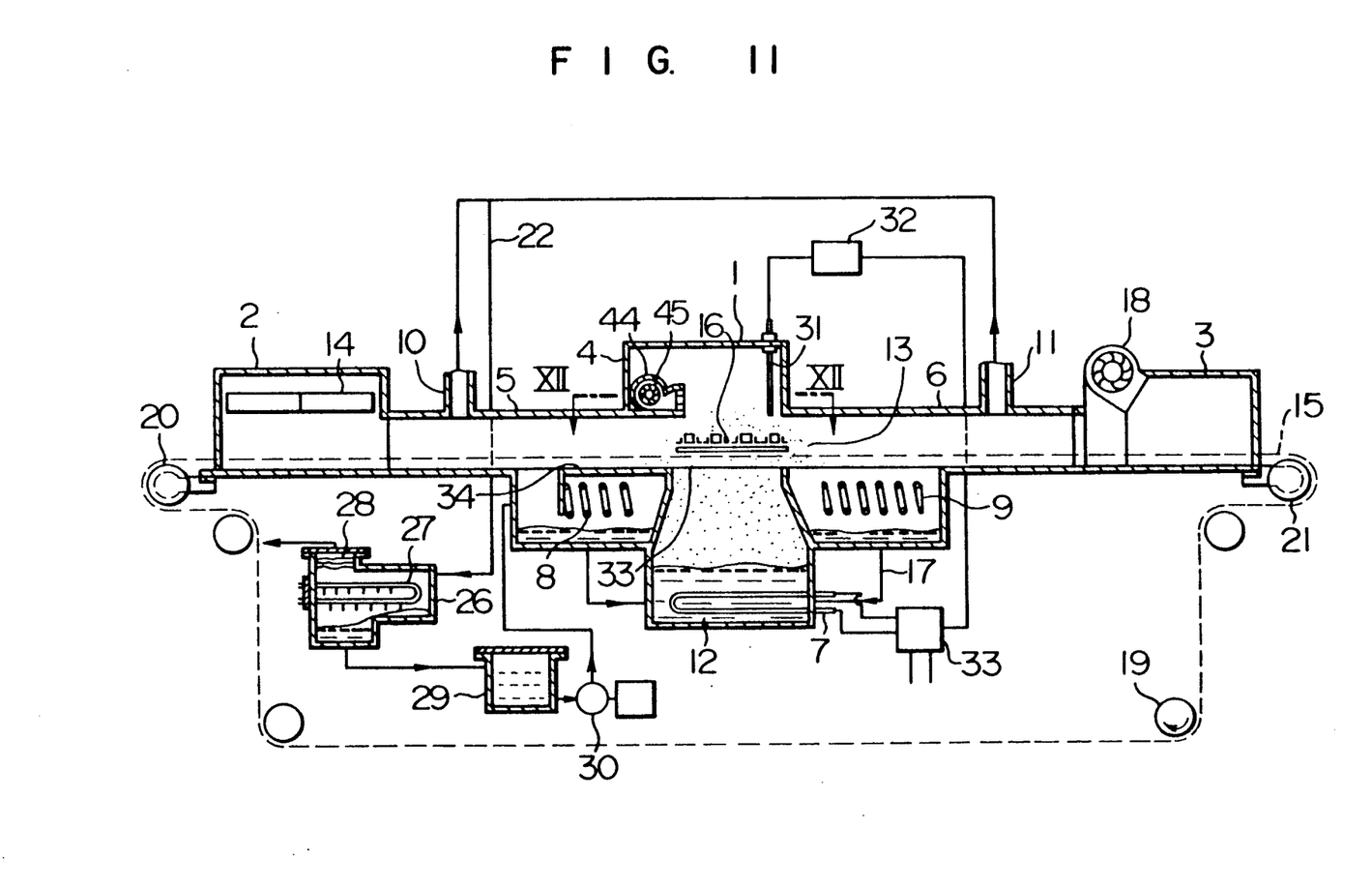
FIG. 11 is a cross-sectional side view of the vapor reflow type soldering apparatus according to a seventh embodiment of the invention.
Figure 12:
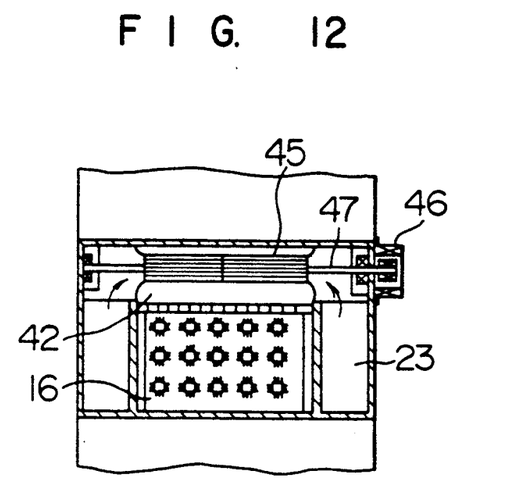
FIG. 12 is a cross-sectional view taken along the line XII—XII of FIG. 11.

FIGS. 11 and 12 show a vapor reflow type soldering apparatus in accordance with a seventh embodiment of the invention. In the seventh embodiment, there is further provided a blower within the upper vapor chamber 42. The blower 44 includes an impeller 45 installed in the upper vapor chamber 4 and a rotary shaft 47 extending to the outside of the vapor generating tank 4. The rotary shaft 47 is connected to a motor 46 such that it is rotated by the motor 46 fixed to the outside of the vapor generating tank 4.

The saturated vapor 13 rising through the longitudinal side wall passages 23 is drawn by the blower 44 and is forcibly made to flow out of the upper vapor discharge opening 43 onto the printed circuit board 16. This forced drawing ensures that the vapor chamber 42 is filled with the saturated vapor 13 and the saturated vapor 13 is distributed evenly to the printed circuit board 16. The flow rate of the saturated vapor 13 from the upper vapor discharge opening 43 can be controlled by regulating the number of revolutions of the blower 44. Therefore, the flow rate of the saturated vapor 13 onto the printed circuit board 16 can be controlled according to the mounting condition of the electronic parts of the printed circuit board 16. Thus, it is possible to heat the printed circuit board 16 in response to the mounting condition of the electronic parts, thereby enabling a supply of an optimum amount of the saturated vapor; this enhances an economic advantage of the apparatus.

Figure 13:
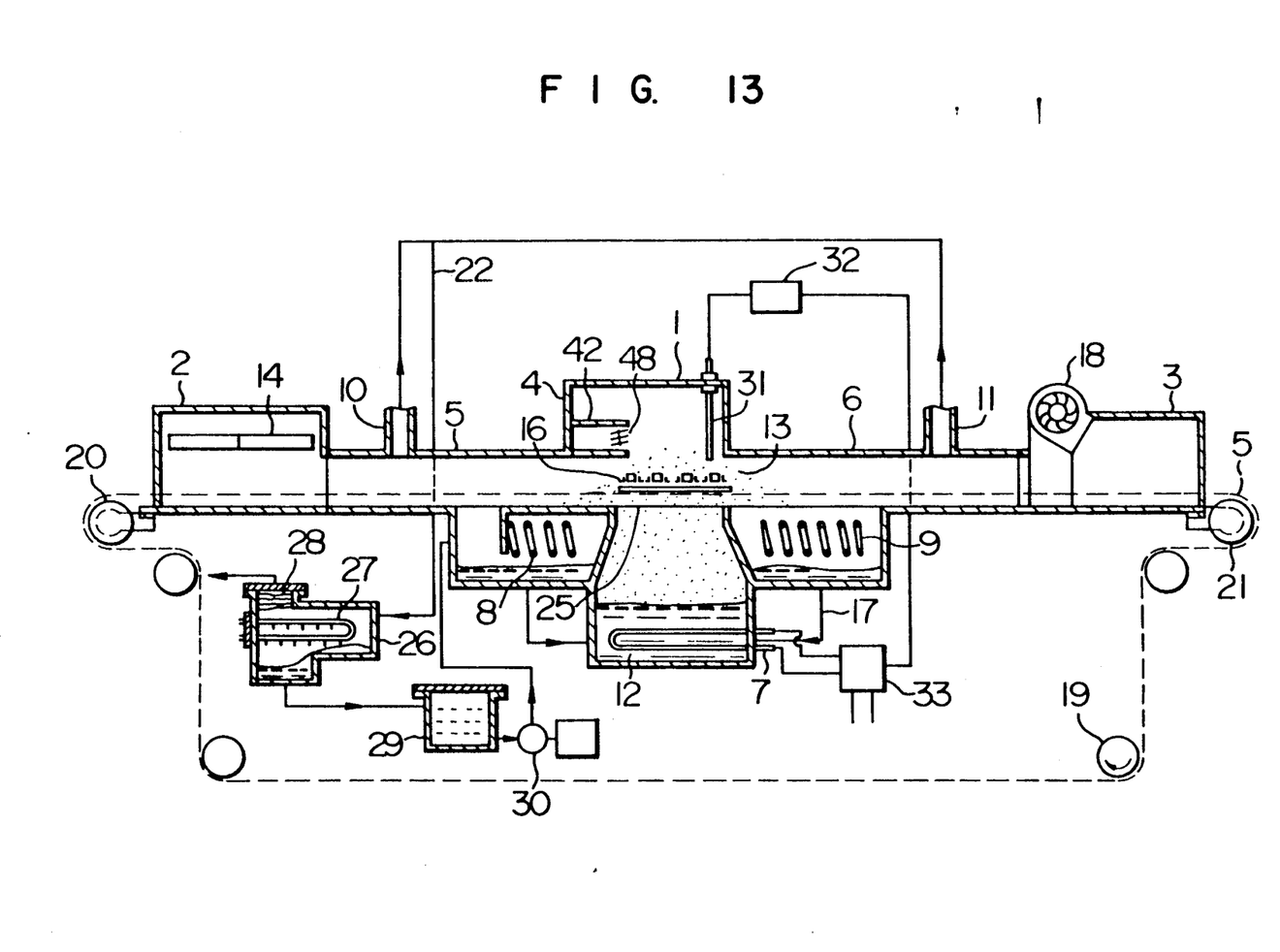
FIG. 13 is a cross-sectional side view of the vapor reflow type soldering apparatus according to an eighth embodiment of the invention.

FIG. 13 shows a vapor reflow type soldering apparatus according to an eighth embodiment of the invention. In the eighth embodiment, which is a modification of the sixth embodiment, there is further provided at the upper vapor discharge opening 43 of the upper vapor chamber 42, a louver 48 for varying the opening area of the upper vapor discharge opening 43. The louver 48 is installed in such a way that the slats thereof can be turned up or down. The flow rate of the vapor onto the printed circuit board 26 can be controlled by varying the opening area of the upper vapor discharge opening 43 by turning the slats of the louver 48. In this embodiment, too, it is possible to achieve a uniform temperature distribution across the width of the printed circuit board 16 and supply the saturated vapor at the optimum flow rate, thereby improving an economic aspect of the apparatus.

Figure 14:
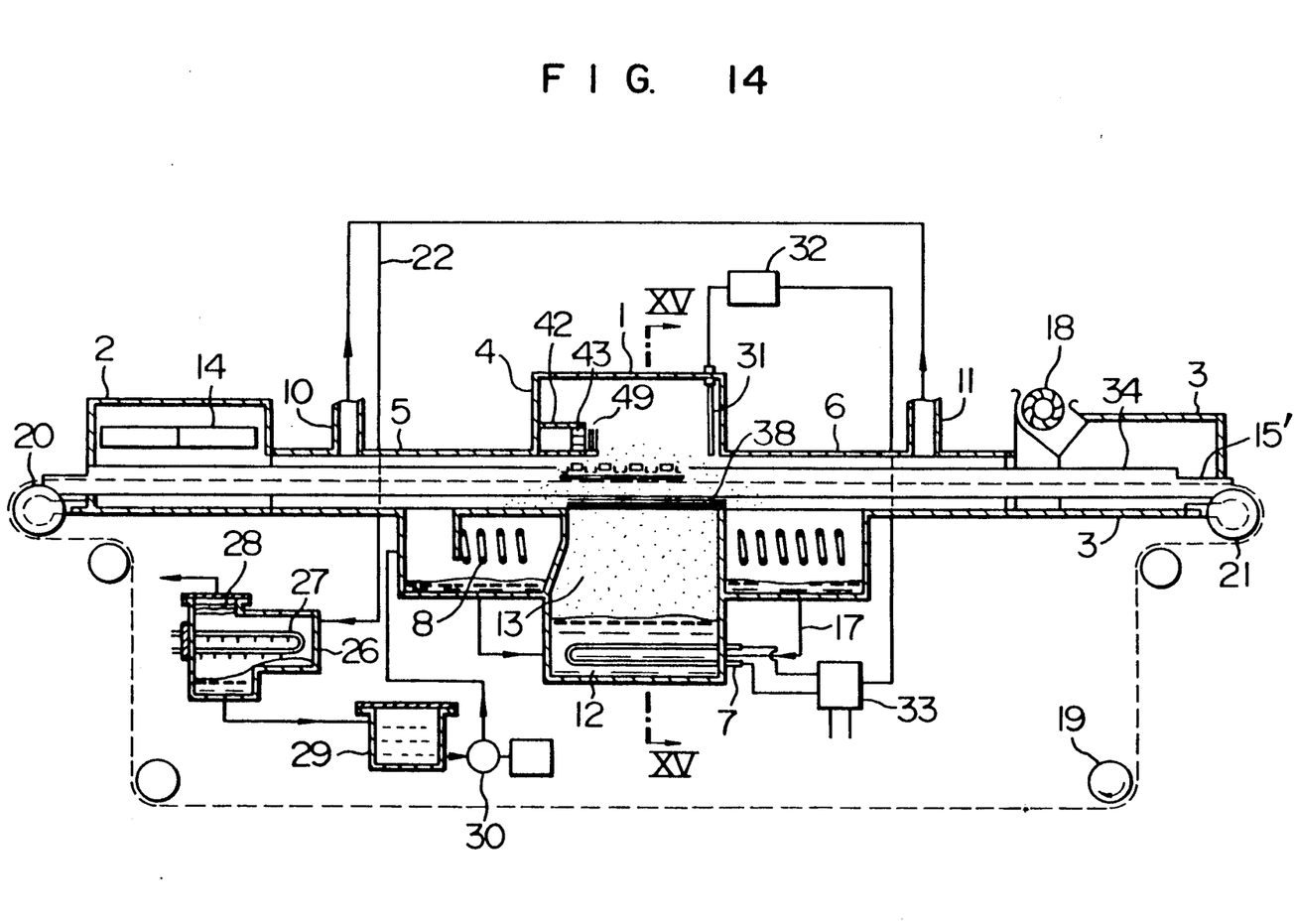
FIG. 14 is a cross-sectional side view of the vapor reflow type soldering apparatus according to a ninth embodiment of the invention.
Figure 15:
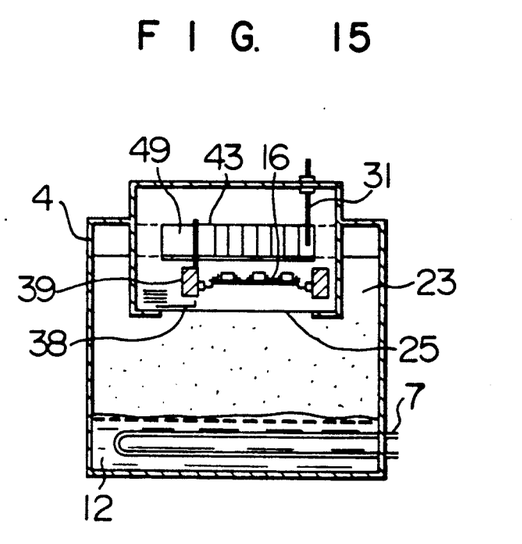
FIG. 15 is a cross-sectional view taken along the line XV—XV of FIG. 14.

FIGS. 14 and 15 show a vapor reflow type soldering apparatus according to a ninth embodiment of the invention. The ninth embodiment is a combination of the fourth embodiment shown in FIGS. 6 and 7 and the sixth embodiment of FIGS. 9 and 10.

In the ninth embodiment, a conveyor 15' is used which can have its width varied to suit the size of printed circuit boards to be processed. The sliding door type shutter 38 is provided at the peripheral part of the lower vapor discharge opening 25, and the movable conveyor guide 39 is connected at a lower part thereof with the shutter 38. The longitudinal side wall passages are communicated with the upper vapor chamber 42 at the upper position of the vapor generating tank 4. The upper vapor discharge opening 43 has mounted thereto a sliding door type shutter 49 for varying the opening area of the upper vapor discharge opening 43. The shutter 49 is connected with the movable conveyor guide 39 for the conveyor 15'. Therefore, as the movable conveyor guide 39 is moved in the widthwise direction of the conveyor, the shutters 38 and 49 are pulled out, thereby varying the opening areas of the upper and lower vapor discharge openings 25, 43 to suit the size of the printed circuit board 16 to be processed.

Since both the lower and upper vapor discharge openings 25 and 43 are varied in area to suit the size of the printed circuit board 16, the amounts of vapor discharged from both of these discharge openings can be controlled to an amount necessary for the soldering of the printed circuit board. Thus, the economic aspect of the apparatus can be improved and the electronic parts are prevented from being heated excessively. Furthermore, the vapor 13 is discharged onto the printed circuit board 16 from the upper vapor discharge opening 43 that extends in the widthwise direction of the apparatus, thereby making uniform the temperature distribution across the width of the printed circuit board 16 and improving the reliability of soldering work.

The first, second, third, sixth, seventh and eighth embodiments are shown in respective drawings as they include a fixed type conveyor, the width of which cannot be varied. It, however, should be noted that they are not limited to the fixed type conveyor and they may include the conveyor, the width of which can be varied, used in the fourth, fifth and ninth embodiments.

What is claimed is:

1. A vapor reflow type soldering apparatus comprising:
   a vapor generating tank, disposed substantially centrally in said apparatus, for receiving therein a thermal medium and saturated vapor of said thermal medium;
   a preheating chamber arranged upstream of said vapor generating tank;
   a cooling chamber arranged downstream of said vapor generating tank;
   an inlet side passage connecting said vapor generating tank an said preheating chamber;
   an outlet side passage connecting said vapor generating tank and said cooling chamber;
   a conveyor extending horizontally through said preheating chamber, said inlet side passage, said vapor generating tank, said outlet side passage and said cooling chamber;
   an outlet side exhaust port provided at said outlet side passage;
   an inlet side cooler arranged beneath said inlet side passage;
   an outlet side cooler arranged beneath said outlet side passage and extending close to said outlet side exhaust port; and
   means for holding the height of said saturated vapor flowing into said inlet side passage; said means for holding the height of said saturated vapor including a cover provided at an upper position of said inlet side cooler and said cover has formed in the upper surface thereof grooves for offering resistance to the flow of the saturated vapor moving toward the inlet.

2. A vapor reflow type soldering apparatus comprising:
   a vapor generating tank, disposed substantially centrally in said apparatus, for receiving therein a thermal medium and saturated vapor of said thermal medium;
   a preheating chamber arranged upstream of said vapor generating tank;
   a cooling chamber arranged downstream of said vapor generating tank;
   an inlet side passage connecting said vapor generating tank and said preheating chamber;
   an outlet side passage connecting said vapor generating tank and said cooling chamber;
   a conveyor extending horizontally through said preheating chamber, said inlet side passage, said vapor generating tank, said outlet side passage and said cooling chamber;
   an outlet side exhaust port provided at said outlet side passage;
   an inlet side cooler arranged beneath said inlet side passage;
   an outlet side cooler arranged beneath said outlet side passage and extending close to said outlet side exhaust port and
   means for holding the height of said saturated vapor flowing into said inlet side passage; said means for holding the height of said saturated vapor including additional longitudinal side walls, provided at a portion of said inlet side passage which is just before said vapor generating tank, for narrowing the passage area of said inlet side passage, and additional longitudinal side walls, provided at a portion of said outlet side passage which is just after said vapor generating tank, for narrowing the passage area of said outlet wide passage.

3. A vapor reflow type soldering apparatus comprising:
- a vapor generating tank, disposed substantially centrally in said apparatus, for receiving therein a thermal medium and saturated vapor of said thermal medium;
- a preheating chamber arranged upstream of said vapor generating tank;
- a cooling chamber arranged downstream of said vapor generating tank;
- an inlet side passage connecting said vapor generating tank and said preheating chamber;
- an outlet side passage connecting said vapor generating tank and said cooling chamber;
- a conveyor extending horizontally through said preheating chamber, said inlet side passage, said vapor generating tank, said outlet side passage and said cooling chamber;
- an outlet side exhaust port provided at said outlet side passage;
- an inlet side cooler arranged beneath said inlet side passage;
- an outlet side cooler arranged beneath said outlet side passage and extending close to said outlet side exhaust port; and
- means for holding the height of said saturated vapor flowing into said inlet side passage; said means for holding the height of said saturated vapor including a cover provided at an upper position of said inlet side cooler, additional longitudinal side walls, provided at a portion of said inlet side passage which is just before said vapor generating tank, for narrowing the passage area of said inlet side passage, and additional longitudinal side walls, provided at a portion of said outlet side passage which is just after said vapor generating tank, for narrowing the passage of said outlet side passage.

4. The apparatus according to claim 2, wherein said additional longitudinal side walls provided within said inlet side passage are extended longer than said additional longitudinal side walls provided within said outlet side passage.

5. The apparatus according to claim 3, wherein said additional longitudinal side wall provided within said inlet side passage are extended longer than said additional longitudinal side wall provided within said outlet side passage.

6. A vapor reflow type soldering apparatus comprising:
- a vapor generating tank, disposed substantially centrally in said apparatus, for receiving therein a thermal medium and saturated vapor of said thermal medium;
- a preheating chamber arranged upstream of said vapor generating tank;
- a cooling chamber arranged downstream of said vapor generating tank;
- an inlet side passage connecting said vapor generating tank and said preheating chamber;
- an outlet side passage connecting said vapor generating tank and said cooling chamber;
- a conveyor extending horizontally through said preheating chamber, said inlet side passage, said vapor generating tank, said outlet side passage and said cooling chamber, wherein the width of said conveyor is variable;
- an outlet side exhaust port provided at said outlet side passage;
- an inlet side cooler arranged beneath said inlet side passage and having a cover provided at an upper position thereof;
- an outlet side cooler arranged beneath said outlet side passage and extending close to said outlet side exhaust port;
- a lower vapor discharge opening formed beneath said conveyor within said vapor generating tank; and
- a shutter connected with a lower portion of a movable conveyor guide for said conveyor and also with the peripheral part of said lower vapor discharge opening, whereby the opening area of said lower vapor discharge opening can be varied as the movable conveyor guide is moved widthwise.

7. The apparatus according to claim 6, further comprising
- longitudinal vapor discharge openings which are opened above and along said conveyor within said vapor generating tank; and
- means for changing the position of one of said longitudinal vapor discharge openings, including a member fixed to the movable conveyor guide and having an opening formed at a position thereof corresponding to said longitudinal vapor discharge opening and a bellows member connected to an end of said member and also to a peripheral part of said longitudinal vapor discharge opening, whereby the position of said longitudinal vapor discharge opening is changed as said movable conveyor guide is moved widthwise.

8. The apparatus according to claim 6, further comprising
- an upper vapor chamber provided above said conveyor within the vapor generating tank and having at a widthwise side wall thereof an upper vapor discharge opening extending in the widthwise direction of said conveyor; and
- a shutter provided at said upper vapor discharge opening so as to vary the opening area of said upper vapor discharge opening and connected to the movable conveyor guide, whereby the opening area of said upper vapor discharge opening is varied as the movable conveyor guide is moved widthwise.

9. A vapor reflow type soldering apparatus comprising:
- a vapor generating tank, disposed substantially centrally in said apparatus, for receiving therein a thermal medium and saturated vapor of said thermal medium;
- a preheating chamber arranged upstream of said vapor generating tank;
- a cooling chamber arranged downstream of said vapor generating tank;
- an inlet side passage connecting said vapor generating tank and said preheating chamber;
- an outlet side passage connecting said vapor generating tank and said cooling chamber;
- a conveyor extending horizontally through said preheating chamber, said inlet side passage, said vapor generating tank, said outlet side passage and said cooling chamber;
- an outlet side exhaust port provided at said outlet side passage;

an inlet side cooler arranged beneath said inlet side passage and having a cover provided at an upper position thereof;

an outlet side cooler arranged beneath said outlet side passage and extending close to said outlet side exhaust port;

a lower vapor discharge opening formed beneath said conveyor within said vapor generating tank; and an upper vapor chamber provided above said conveyor within said vapor generating tank having formed at at widthwise side wall thereof an upper vapor discharge opening extending in the widthwise direction o said conveyor; in said upper vapor chamber there is installed a blower which draws the saturated vapor and makes the vapor flow out of said upper vapor discharge opening.

10. A vapor reflow type soldering apparatus comprising:

a vapor generating tank, disposed substantially centrally in said apparatus, for receiving therein a thermal medium and saturated vapor of said thermal medium;

a preheating chamber arranged upstream of said vapor generating tank;

a cooling chamber arranged downstream of said vapor generating tank;

an inlet side passage connecting said vapor generating tank and said preheating chamber;

an outlet side passage connecting said vapor generating tank and said cooling chamber;

a conveyor extending horizontally through said preheating chamber, said inlet side passage, said vapor generating tank, said outlet side passage and said cooling chamber;

an outlet side exhaust port provided at said outlet side passage;

an inlet side cooler arranged beneath said inlet side passage and having a cover provided at an upper position thereof;

an outlet side cooler arranged beneath said outlet side passage and extending close to said outlet side exhaust port;

a lower vapor discharge opening formed beneath said conveyor within said vapor generating tank; and an upper vapor chamber provided above said conveyor within said vapor generating tank having formed at at widthwise side wall thereof an upper vapor discharge opening extending in the widthwise direction of said conveyor; at said upper vapor discharge opening, there is installed a louver which varies the opening area of said vapor discharge opening.

11. A vapor reflow type soldering apparatus comprising:

a vapor generating tank, disposed substantially centrally in said apparatus, for receiving therein a thermal medium and saturated vapor of said thermal medium;

a preheating chamber arranged upstream of said vapor generating tank;

a cooling chamber arranged downstream of said vapor generating tank;

an inlet side passage connecting said vapor generating tank and said preheating chamber;

an outlet side passage connecting said vapor generating tank and said cooling chamber;

a conveyor extending horizontally through said preheating chamber, said inlet side passage, said vapor generating tank, said outlet side passage and said cooling chamber;

an outlet side exhaust port provided at said outlet side passage;

an inlet side cooler arranged beneath said inlet side passage and having a cover provided at an upper position thereof;

an outlet side cooler arranged beneath said outlet side passage and extending close to said outlet side exhaust port;

a lower vapor discharge opening formed beneath said conveyor within said vapor generating tank; and an upper vapor chamber provided above said conveyor within said vapor generating tank having formed at at widthwise side wall thereof an upper vapor discharge opening extending in the widthwise direction of said conveyor; wherein said conveyor is of a type that can vary the width thereof, and wherein a shutter is provided at said upper vapor discharge opening so as to vary the opening area of said upper vapor discharge opening and said shutter is connected to a movable conveyor guide for said conveyor, whereby the opening area of said upper vapor discharge opening is varied as the movable conveyor guide is moved widthwise.

* * * * *